United States Patent Office 3,457,259
Patented July 22, 1969

3,457,259
6α-TRIFLUOROMETHYL SUBSTITUTED STEROIDS
OF THE 5α,5β, AND Δ⁴-PREGNANE SERIES
John H. Fried, Palo Alto, Calif., assignor to Syntex Corporation, Panama, Panama, a corporation of Panama
No Drawing. Filed June 27, 1966, Ser. No. 560,865
Int Cl. C07c 169/30, 173/00, 169/36
U.S. Cl. 260—239.55                    13 Claims

ABSTRACT OF THE DISCLOSURE

6α-trifluoromethyl substituted steroids of the 5α-, 5β- and Δ₄-pregnane series.

---

The present invention relates to novel cyclopentanophenanthrene compounds.

More particularly, the present invention relates to novel 6α-trifluoromethyl cyclopentanophenanthrene compounds which are useful pharmacological agents possessing progestational, anti-estrogenic, anti-migraine and anti-androgenic activity.

The novel compounds of the present invention are represented by the following formulas.

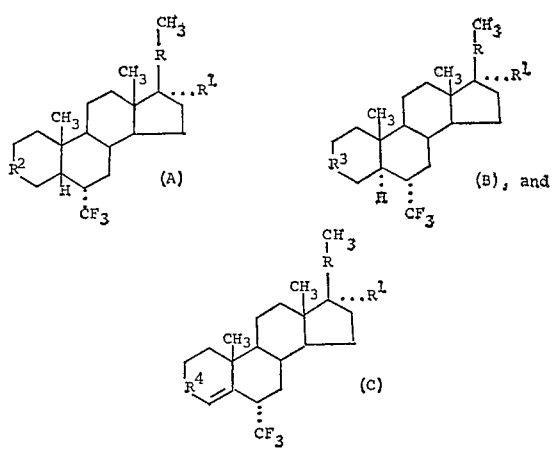

wherein R represents a carbonyl group

or the group

$R^1$ represents hydrogen, hydroxy or a carboxylic acyloxy group of less than 12 carbon atoms; $R^2$ represents a carbonyl group

or the group

and $R^3$ represents a carbonyl group

or the group

wherein R' represents hydrogen, a carboxylic acyl group of less than 12 carbon atoms, tetrahydropyran-2'-yl, or tetrahydrofuran-2'-yl; and $R^4$ represents the group

or the group

wherein R'' represent tetrahydropyran-2'-yl or tetrahydrofuran-2'-yl.

The carboxylic acyl and acyloxy groups of the compounds of the present invention contain less than 12 carbon atoms and may be of a straight, branched, cyclic or cyclic-aliphatic chain structure. This structure may be saturated, unsaturated, or aromatic and optionally substituted by functional groups such as hydroxy, alkoxy containing up to 5 carbon atoms, acyloxy containing up to 12 carbon atoms, nitro, amino, halogeno, and the like. Typical esters thus include acetate, propionate, enanthate, benzoate, trimethylacetate, t-butylacetate, phenoxyacetate, cyclopentylpropionate, aminoacetate, β-chloropropionate, adamantoate, and the like.

The novel compounds of the present invention represented by Formulas A and B above are prepared according to the following illustrated process.

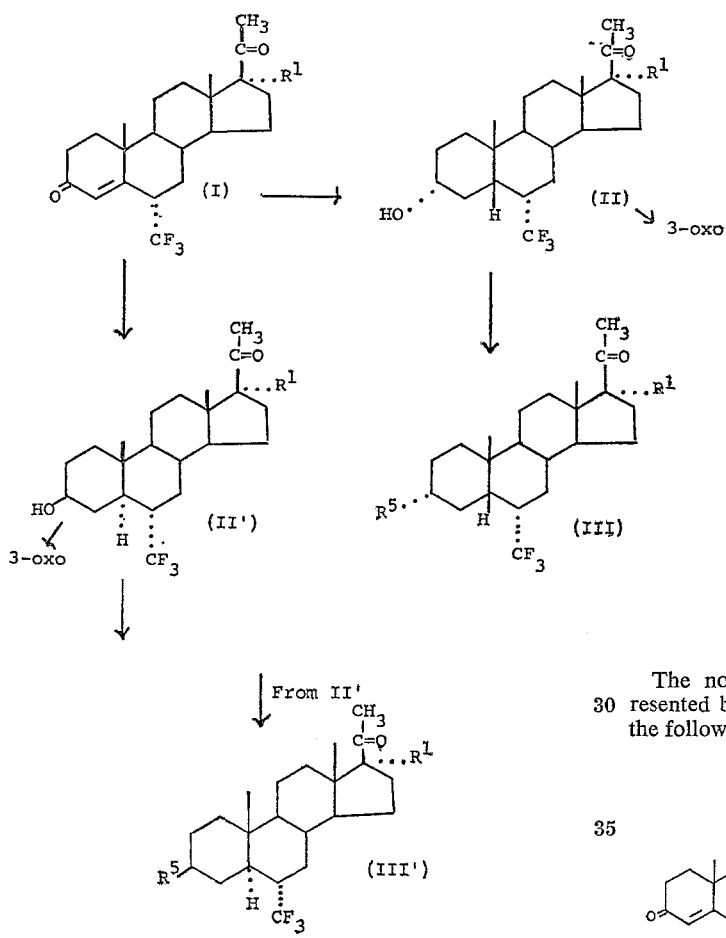

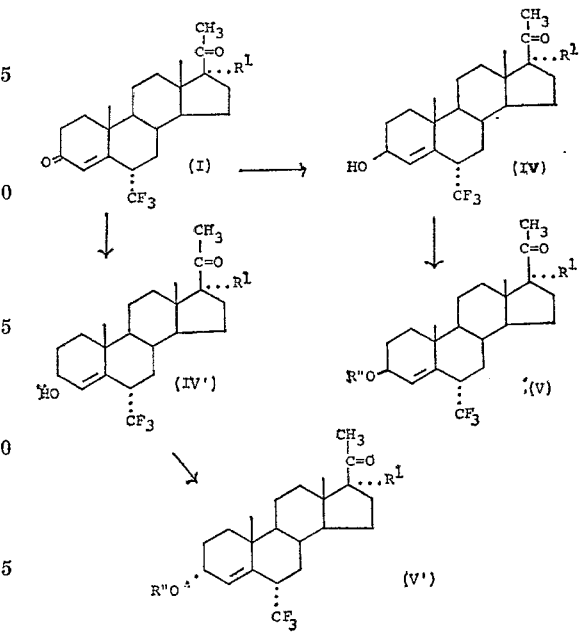

In the above formulas R¹ is as defined hereinabove and R⁵ represents a carboxylic acyloxy group of less than 12 carbon atoms, tetrahydropyran-2'-yloxy or tetrahydrofuran-2'-yloxy.

In practicing the process outlined above, the starting material I, 6α-trifluoromethylpregn-4-ene-3,20-dione, 6α-tri - fluoromethyl - 17α - hydroxypregn - 4 - ene - 3,20-dione - 17 - acylate, e.g. 17 - acetate, or 6α - trifluoromethyl - 17α - hydroxypregn - 4 - ene - 3,20 - dione (disclosed in United States application Ser. No. 68,376, filed Nov. 10, 1960, now U.S. Pat. No. 3,328,431 is reacted with hydrogen over a platinum oxide catalyst to furnish a mixture of the 3α-hydroxy-5β-derivative (II) and the 3β-hydroxy-5α-derivative (II') which are separated by chromatography. The 3-hydroxy compounds (II and II') are oxidized as by treatment with, e.g., chromium trioxide in pyridine to yield the novel 3-oxo compounds of the present invention. By treatment of the 3-hydroxy steroids (II or II') with dihydropyran or dihydrofuran in the presence of p-toluenesulfonyl chloride, the corresponding 3 - tetrahydropyran - 2' - yloxy and 3 - tetrahydrofuran-2'-yloxy compounds (III and III'; R⁵ is tetrahylropyran-2'-yloxy or tetrahydrofuran-2'-yloxy) are obtained. Alternatively, the steroids II and II' are acylated as by treatment with a carboxylic acid anhydride, e.g. acetic anhydride, propionic anhydride and the like, in pyridine or a carboxylic acid halide to furnish the novel 3α-acyloxy-5β- and 3β-acyloxy-5α-derivatives of the present invention (III and III', R⁵ is acyloxy).

By treatment of the steroids II, II', III and III' with, e.g. sodium borohydride in methanol for a period of time of the order of about 16 hours or more, the 20-oxo group is reduced to the corresponding free alcohol to furnish a mixture of the 20α-hydroxy and 20β-hydroxy derivatives from which the 20β-hydroxy compounds of the present invention can be separated.

The novel compounds of the present invention represented by Formula C above, are prepared according to the following outlined process.

In the above formulas, R¹ and R" are as defined hereinabove.

In practicing the above outlined process, the 3-keto-Δ⁴ starting material I is reacted with sodium borohydride or lithium tri-t-butoxyaluminum hydride in an organic solvent such as methanol, ethanol, tetrahydrofuran, doxane, and the like to furnish a mixture of the corresponding 3β-hydroxy-Δ⁴ and 3α-hydroxy-Δ⁴ derivatives IV and IV', respectively which are separated by chromatography. The 3-hydroxy derivatives are converted into the corresponding 3-tetrahydropyran-2'-yl ether or 3-tetrahydrofuran-2'-yl ether (V and V') by treatment with dihydropyran and dihydrofuran, respectively, in the presence of a catalyst such as p-toluenesulfonyl chloride.

The following examples serve to illustrate but are not intended to limit the scope of the present invention.

Example 1

A solution of 2.0 g. of 6α-trifluoromethyl-17α-hydroxypregn-4-ene-3,20-dione-17-acetate is hydrogenated with 0.1 g. of platinum oxide catalyst until the theoretical amount of hydrogen is consumed. The catalyst is removed by filtration and the filtrate is evaporated to dryness to yield a mixture of 3α,17α-dihydroxy-6α-trifluoromethyl-5β - pregnan - 20 - one - 17 - acetate and 3β,17α- - dihydroxy - 6α - trifluoromethyl - 5β - pregnan - 20 - one-17-acetate which are separated by chromatography on alumina eluting with benzene-ether, ether and then ether-methanol.

By repeating the foregoing process using 6α-trifluoromethylpregn - 4 - ene - 3,20 - dione and 6α - trifluoromethyl - 17α - hydroxypregn - 4 - ene - 3,20 - dione as the starting material, there is obtained 3α-hydroxy-6α-trifluoromethyl - 5β - pregnan - 20 - one, 3β - hydroxy - 6α-trifluoromethyl - 5α - pregnan - 20 - one, 3α, 17α - dihydroxy - 6α - trifluoromethyl - 5β - pregnan - 20 - one and 3β,17α - dihydroxy - 6α - trifluoromethyl - 5α-pregnan-20α-one, respectively.

Example 2

A mixture of one gram of 3α, 17α-dihydroxy-6α-trifluoromethyl - 5β - pregnan - 20 - one - 17 - acetate, 1 g. of potassium hydroxide in 10 ml. of water, and 90 ml. of methanol is refluxed for one hour. At the end of this time, the methanol is evaporated under reduced pressure and the residue is extracted with ethyl acetate and water. Evaporation of the ethyl acetate from these extracts yields 3α,17α - dihydroxy - 6α - trifluoromethyl - 5β - pregnan-20-one which is collected by filtration and recrystallized from acetone: hexane.

By use of this process, 3β,17α-dihydroxy-6α-trifluoromethyl-5α-pregnan-20-one-17-acetate is converted into 3β,17α - dihydroxy - 6α - trifluoromethyl - 5α - pregnan-20-one.

Example 3

A solution of 6 g. of 3α,17α-dihydroxy-6α-trifluoromethyl-5β-pregnan-20-one-17-acetate in 120 ml. of pyridine is added to a mixture of 6 g. of chromium trioxide in 20 ml. of pyridine. The reaction mixture is allowed to stand at room temperature for 15 hours, diluted with ethyl acetate and filtered through Celite diatomaceous earth. The filtrate is washed well with water, dried and evaporated to dryness to yield 17α-hydroxy-6α-trifluoromethyl-5β-pregnane-3,20-dione-17-acetate which may be further purified by recrystallization from acetone:hexane.

By repeating the process of this example using the other 3-hydroxy compounds of this invention, there is obtained 17α - hydroxy - 6α - trifluoromethyl - 5α - pregnane - 3,20-dione - 17 - acetate, 6α - trifluoromethyl - 5β - pregnane-320 - dione, 6α - trifluoromethyl - 5α - pregnane - 3,20-dione, 17α - hydroxy - 6α - trifluoromethyl - 5β - pregnane-3,20 - dione and 17α - hydroxy - 6α - trifluoromethyl-5α-pregnane-3,20-dione.

Example 4

Two milliliters of dihydropyran are added to a solution of 1 g. of 3α,17α-dihydroxy-6α-trifluoromethyl-5β-pregnan-20-one-17-acetate in 15 ml. of benzene. About 1 ml. is removed by distillation to remove moisture and 0.4 g. of p-toluenesulfonyl chloride is added to the cooled solution. This mixture is allowed to stand at room temperature for four days, and is then washed with aqueous sodium carbonate solution and water, dried and evaporated. The residue is chromatographed on neutral alumina, eluting with hexane, to yield 3α-(tetrahydropyran-2'-yloxy)-17α-hydroxy - 6α - trifluoromethyl - 5β - pregnan - 20 - one-17-acetate which is recrystallized from pentane.

By using as the starting material in the process of this example, the other 3-hydroxy compounds of the present invention, the corresponding 3-tetrahydropyran-2'-yl ether is obtained, e.g. 3α-(tetrahydropyran-2'-yloxy)-17α-hydroxy - 6α - trifluoromethyl - 5β - pregnan - 20 - one and 3α - (tetrahydropyran - 2' - yloxy) - 6α - trifluoromethyl-5β-pregnan-20-one.

Example 5

To a solution of 1 g. of 3α,17α-dihydroxy-6α-trifluoromethyl-5β-pregnan-20-one-17-acetate in 20 ml. of benzene, 20 ml. of dihydrofuran is added. Five milliliters is distilled off to remove moisture, and the mixture is allowed to cool to room temperature. To the cooled mixture, 0.2 g. of freshly purified p-toluenesulfonyl chloride is added. The mixture is stirred at room temperature for 24 hours and then poured into an excess of 5% aqueous sodium bicarbonate solution. The product is extracted with ethyl acetate, the organic solution is washed with water to neutral, dried over anhydrous magnesium sulfate, and evaporated to dryness under reduced pressure. The residue crystallizes on the addition of ether to yield 3α - (tetrahydrofuran-2'-yloxy)-17α-hydroxy-6α-trifluoromethyl-5β-pregnan-20-one-17-acetate.

By repeating the above procedure using as the starting material 3α,17α - dihydroxy - 6α-trifluoromethyl-5β-pregnan - 20 - one, 3β,17α-dihydroxy-6α-trifluoromethyl-5α-pregnan - 20 - one - 17-acetate, 3β-hydroxy-6α-trifluoromethyl-5α-pregnan-20-one, and 3β,17α-dihydroxy-6α-trifluoromethyl-5α-pregnan-20-one, there are obtained the corresponding 3-tetrahydrofuran-2'-yl ethers.

Example 6

A mixture of 1 g. of 3α,17α-dihydroxy-6α-trifluoromethyl - 5β - pregnan-20-one-17-acetate, 4 ml. of pyridine and 2 ml. of acetic anhydride is allowed to stand at room temperature for 15 hours. The mixture is then poured into ice water and the solid which forms is collected by filtration washed with water and dried to yield 3α17α-dihydroxy - 6α - trifluoromethyl - 5β-pregnan-20-one-3-17-diacetate which may be further purified through recrystallization from acetone:hexane.

By repeating the above process using other 3-hydroxy compounds of the present invention as the starting material the corresponding 3-acetate is obtained, e.g., 3α-hydroxy - 6α - trifluoromethyl-6α-pregnan-20-one-3-acetate, 3β - hydroxy - 6α - trifluoromethyl-5α-pregnan-20-one-3-acetate, 3β,17α-dihydroxy-6α-trifluoromethyl-5α-pregnan-20-one-3,17-diacetate Similarly, by using other carboxylic acid anhydrides in the process of this example, other 3-acylates are obtained, e.g. 3-propionate, 3-trichloroacetate, and the like.

Example 7

A mixture of 1 g. of 3α-(tetrahydropyran-2'-yloxy)-17α - hydroxy - 6α-trifluoromethyl-5β-pregnan-20-one-17-acetate and 1 g. of potassium hydroxide in 10 ml. of water and 90 ml. of methanol is refluxed for one hour. At the end of this time, the methanol is evaporated under reduced pressure and the residue is extracted with ethyl acetate and water. Evaporation of the ethyl acetate from these extracts yields 3α-(tetrahydropyran-2'-yloxy)-17α-hydroxy - 6α - trifluoromethyl-5β-pregnan-20-one which is collected by filtration and recrystallized from acetone: hexane.

Similarly, 3α - (tetrahydrofuran-2'-yloxy)-6α-trifluoromethyl - 17α - hydroxy-5β-pregnan-20-one-17-acetate, 3β-(tetrahydropyran - 2' - yloxy) - 6α - trifluoromethyl-17α-hydroxy-5α-pregnan-20-one-17-acetate, and 3β-(tetrahydrofuran - 2' - yloxy)-6α-trifluoromethyl-17α-hydroxy-5α-pregnan-20-one-17-acetate are converted into the corresponding 17-free alcohol.

Example 8

A mixture of 1 g. of 3α,17α-dihydroxy-6α-trifluoromethyl-5β-pregnan-20-one, 1 g. of p-toluenesulfonic acid monohydrate, 50 ml. of caproic acid and 25 ml. of caproic anhydride is allowed to stand at room temperature for 24 hours, and then poured into water and stirred. This mixture is then extracted with methylene chloride and these extracts are dried and evaporated to yield 3α,17α - dihydroxy - 6α-trifluoromethyl-5β-pregnan-20-one-3,17-dicaproate which is recrystallized from acetone:ether.

Similarly, 3β,17α - dihydroxy - 6α-trifluoromethyl-5α-pregnan-20-one is converted into 3β,17α-dihydroxy-6α-trifluoromethyl-5α-pregnan-20-one-3,17-dicaproate.

Likewise, by the use of other acids and anhydrides, e.g. valeric acid and valeric anhydride, propionic acid and propionic anhydride, and the like in the process of this example, the corresponding diacylates are obtained, e.g. 3,17-divalerate, 3,17-dipropionate, and the like.

Example 9

One gram of 3α,17α-dihydroxy-6α-trifluoromethyl-5β-pregnan-20-one-3,17-dicaproate is allowed to stand at room temperature for 5 hours with 0.25 grams of potassium hydroxide in 10 ml. of water and 90 ml. of methanol. At the end of this time, the methanol is evaporated under reduced pressure and the residue is extracted with ethyl acetate and water. Evaporation of the ethyl acetate from these extracts yields 3α,17α - dihydroxy - 6α - trifluoromethyl-5β-pregnan-20-one-17-caproate which is collected by filtration and recrystallized from acetone:hexane.

In a similar manner, the other 3,17-diacylates of the present invention are converted into the corresponding 3-hydroxy-17-acylate derivatives.

By use of the process of Example 4, 3α,17α-dihydroxy-6α-trifluoromethyl-5β-pregnan-20-one-17-caproate is converted into 3α-(tetrahydropyran-2′-yloxy)-17α-hydroxy-6α - trifluoromethyl-5β-pregnan-20-one-17-caproate. Similarly, by the use of the process of Example 5, 3α-(tetrahydrofuran - 2′ - yloxy) - 17α-hydroxy-6α-trifluoromethyl-5β-pregnan-20-one-17-caproate is obtained from 3α,17α-dihydroxy - 6α - trifluoromethyl - 5β-pregnan-20-one-17-caproate.

Example 10

A mixture of 1 g. of 6α-trifluoromethyl-17α-hydroxypregn-4-ene-3,20-dione-17-acetate and 1 g. of lithium tri-t-butoxy-aluminum hydride in 50 ml. of tetrahydrofuran is allowed to stand at about 20° C. for twenty four hours. Thereafter, the mixture is evaporated under reduced pressure and the residue is crystallized in acetone:hexane to furnish 3β,17α - dihydroxy-6α-trifluoromethylpregn-4-en-20 - one - 17-acetate. The mother liquors are chromatographed over alumina eluting with benzene-ether, ether and ether-methanol to furnish 3α,17α-dihydroxy-6α-trifluoromethylpregn-4-en-20-one-17-acetate and additional 3β,17α - dihydroxy - 6α - trifluoromethylpregn - 4-en-20-one-17-acetate.

By repeating the process of this example using as the starting material, 6α - trifluoromethylpregn-4-ene-3,20-dione and 6α - trifluoromethyl-17α-hydroxypregn-4-ene-3,20-dione, there is obtained 3α-hydroxy-6α-trifluoromethylpregn -4-en-20-one, 3β - hydroxy - 6α - trifluoromethylpregn-4-en-20-one, 3α,17α - dihydroxy - 6α - trifluoromethylpregn-4-en-20-one and 3β,17α-dihydroxy-6α-trifluoromethylpregn-4-en-20-one, respectively.

Example 11

By using 3β,17α-dihydroxy-6α-trifluoromethylpregn-4-en-20-one-17-acetate as the starting material in the process of Example 4, there is obtained 3β-(tetrahydropyran-2′-yloxy)-17α-hydroxy-6α-trifluoromethylpregn - 4 - en-20-one-17-acetate.

Similarly, by subjecting the other 3-hydroxy-Δ⁴ compounds of Example 10 to the procedure of Example 4, the corresponding 3-tetrahydropyran-2-yl ethers are obtained.

Example 12

By repeating the procedure of Example 5 using as the starting material, the 3-hydroxy-Δ⁴ compounds of Example 10, the corresponding 3-tetrahydrofuran-2′-yl ethers are obtained, e.g. 3β-(tetrahydrofuran-2′-yloxy)-17α-hydroxy - 6α - trifluoromethylpregn-4-en-20-one-17-acetate and 3α-(tetrahydrofuran-2′-yloxy)-17α-hydroxy-6α-trifluoromethylpregn-4-en-20-one-17-acetate.

Example 13

A solution of 1 g. of sodium borohydride in 3 ml. of water is added to an ice-cooled solution of 1 g. of 3α-(tetrahydropyran-2′-yloxy)-17α-hydroxy - 6α - trifluoromethyl-5β-pregnan-20-one-17-acetate in 120 ml. of methanol and the mixture is then allowed to stand for 16 hours at room temperature. The excess reagent is decomposed by addition of acetic acid and the solution is then concentrated to small volume in vacuo and diluted with water. The product is extracted with ethyl acetate and these extracts are washed with water, dried and evaporated. The crude mixture is then separated by chromatography on silica gel to furnish 3α-(tetrahydropyran-2′-yloxy)-6α-trifluoromethyl - 5β - pregna-17α,20β-diol-17-acetate and 3α-(tetrahydropyran-2′-yloxy)-6α-trifluoromethyl-5β-pregna-17α,20α-diol-17-acetate.

In the same manner, the other 20-keto compounds of the present invention are converted into the corresponding 20β-hydroxy and 20α-hydroxy derivatives.

What is claimed is:
1. A compound selected from the group consisting of those of the Formulas A and C:

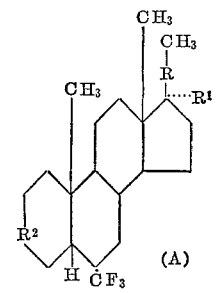

and

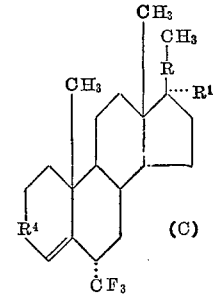

wherein
R is selected from the group consisting of

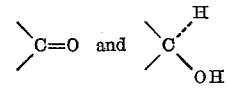

R¹ is selected from the group consisting of hydrogen, hydroxy, and a carboxylic acyloxy group of less than 12 carbon atoms;
R² is selected from the group consisting of

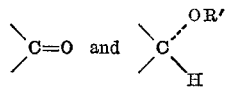

wherein R′ is selected from the group consisting of hydrogen, a carboxylic acyl group of less than 12 carbon atoms, tetrahydropyran-2′-yl, and tetrahydrofuran-2′-yl; and
R⁴ is selected from the group consisting of

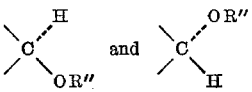

wherein R″ is selected from the group consisting of tetrahydropyran-2′-yl and tetrahydrofuran-2′-yl.

2. A compound according to Formula A of claim 1 wherein R is >C=O, R¹ is a carboxylic acyloxy group of less than 12 carbon atoms and R² is >C=O.

3. A compound according to Formula A of claim 1 wherein R is >C=O, and R² is

4. A compound according to claim 3 wherein R′ is hydrogen.

5. A compound according to claim 3 wherein R′ is tetrahydropyran-2-yl.

6. A compound according to claim 3 wherein R′ is hydrogen or tetrahydropyran-2-yl and R¹ is caproyloxy.

7. A compound according to claim 3 wherein R′ is hydrogen or tetrahydropyran-2-yl and R¹ is acetoxy.

8. A compound according to claim 3 wherein R′ is hydrogen or tetrahydropyran-2-yl and R¹ is hydroxy.

9. A compound according to claim 3 wherein R′ is hydrogen or tetrahydropyran-2-yl and R¹ is hydrogen.

10. A compound according to Formula C of claim 1 wherein R is >C=O and R¹ is hydroxy.

11. A compound according to Formula C of claim 1 wherein R is >C=O and R¹ is acetoxy.

12. A compound of Formula C of claim 1 wherein R is >C=O and R¹ is caproyloxy.

13. A compound according to Formula A of claim 1 wherein R is

References Cited

UNITED STATES PATENTS 3,328,431   6/1967   Bowers et al. _____ 260—397.3
3,331,863   7/1967   Campbell et al. ____ 260—397.4

ELBERT L. ROBERTS, Primary Examiner

U.S. Cl. X.R.

260—397.3, 397.4, 397.5, 999

UNITED STATES PATENT OFFICE
CERTIFICATE OF CORRECTION

Patent No. 3,457,259　　　　　　　　Dated July 22, 1969

Inventor(s) John H. Fried

It is certified that error appears in the above-identified patent and that said Letters Patent are hereby corrected as shown below:

Column 5, line 21, the "α" should be deleted.
Column 6, line 22, after "-one,", insert -- 3α-hydroxy-6α-trifluoromethyl-5β-pregnan-20-one --.

SIGNED AND
SEALED
JUL 28 1970

(SEAL)
Attest:

Edward M. Fletcher, Jr.
Attesting Officer

WILLIAM E. SCHUYLER, JR.
Commissioner of Patents